Aug. 17, 1937.  J. H. WEINER  2,090,086
SIGNALING DEVICE
Filed Feb. 11, 1937
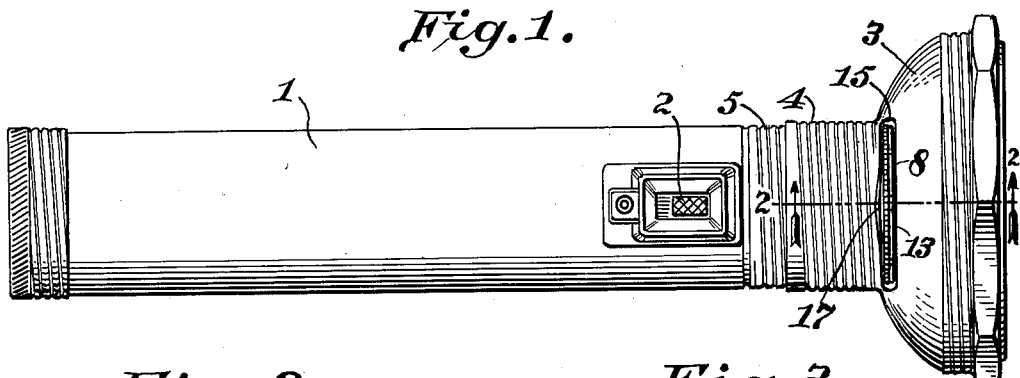
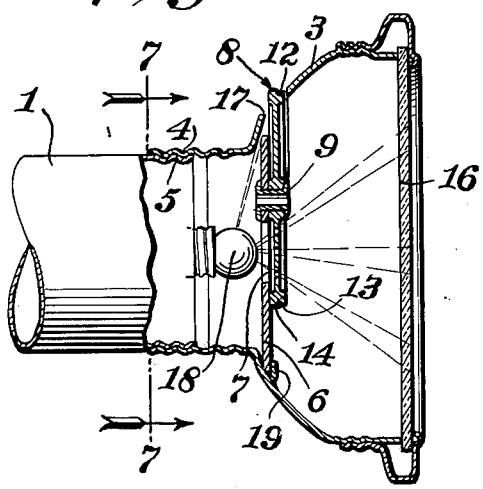
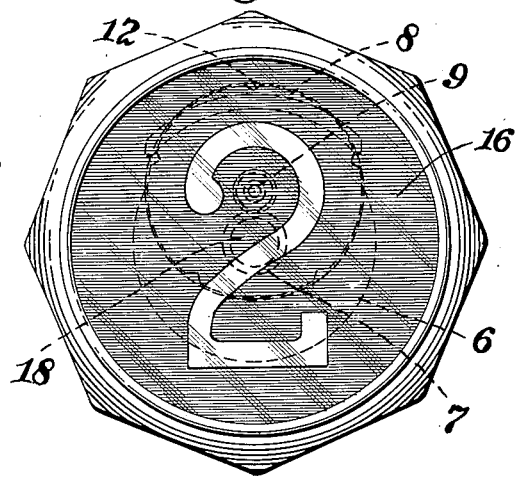
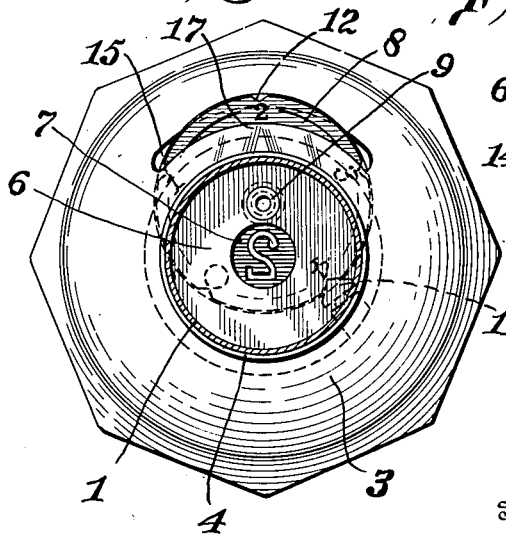
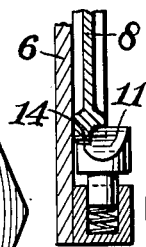
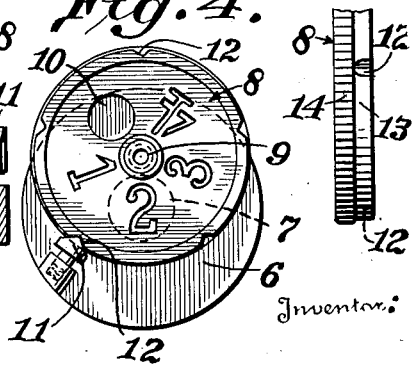
Inventor:
John H. Weiner,
By Parker Cook
Attorneys Patented Aug. 17, 1937

2,090,086

UNITED STATES PATENT OFFICE 2,090,086

SIGNALING DEVICE

John H. Weiner, Washington, Pa.

Application February 11, 1937, Serial No. 125,332

7 Claims. (Cl. 116—133)

My invention relates to new and useful improvements in signaling devices, and more particularly to a flash light in which there is installed a unit, so that different insignia may be flashed on the translucent glass of the flash light, which latter is substituted for the ordinary lens.

The invention is primarily devised to be used in darkened theaters whereby the usher or ushers at the forward end of the house may signal to the ushers at the rear of the house when there are vacant seats for patrons.

One of the objects of the present invention is to produce a device of this nature that is extremely simple in construction and whereby with but a slight change in the cap or bellmouth of the flash light, the single unit may be secured in position, which will last throughout the life of the flash light.

A further object of the invention is to utilize a conventional form of flash light, remove the reflector and the lens, and substitute therefor a translucent glass and a signaling unit, the cost of which will probably not be as great as the cost of the removed reflector and lens.

Still another object of the invention is to produce a signaling device wherein, with a slight movement of the thumb, a numeral may be flashed on the translucent glass to designate the number of vacant seats available. In addition, the unit is so provided that there will be an extra opening or window therein, so that the signaling device, even though it is furnished with a translucent glass, will still afford enough light for the usher to look for lost articles or direct patrons to seats, etc.

Still another object of the invention is to provide a signaling device consisting primarily of one unit made up of two disks, the one being mounted eccentric to the other, so that on a revolving of the eccentrically mounted disk, the desired numeral will appear directly in front of the lamp in the flash light and the image will appear, in a magnified condition of course, upon the translucent glass of the flash light.

Still another object of the invention is to provide the cap or bellmouth of the flash light with an opening through which the knurled eccentric disk of the unit may protrude, so that it may easily be manipulated by the thumb of the operator to change the insignia or image on the flash light.

Still another object of the invention is to so cut the kerf or slot in the bellmouth or cap as to provide a small opening or window adjacent the rear of this disk, which disk will have the numerals on its side near the periphery, and which, by the light through the window, will permit the operator to observe what numeral is being flashed on the glass without the necessity of turning the flash light up into his face to verify the number desired.

With these and other objects in view, the invention consists in certain new and novel features and combination of parts, as will be hereinafter more fully explained and pointed out in the claims.

Referring now to the drawing showing a preferred embodiment,

Fig. 1 is a top plan view of a flash light having the slot formed in the cap or bellmouth through which may be noticed the eccentrically mounted knurled disk of the unit;

Fig. 2 is an enlarged sectional view taken on the line 2—2 of Fig. 1;

Fig. 3 is an enlarged face view showing an image on the glass;

Fig. 4 is a detail view of the unit showing the manner of mounting the eccentric disk and the detent for holding the disk in a desired position when adjusted;

Fig. 5 is an enlarged sectional detail of a portion of the disk and the detent;

Fig. 6 is an enlarged edge view showing the manner of knurling the disk and the arrangement of the notches for receiving the detent; and Fig. 7 is a sectional view taken on the line 7—7 of Fig. 2.

Referring now more specifically to the several views, there may be seen in Fig. 1 a conventional flash light having the barrel 1, the switch 2, and the cap 3, which is threaded, as at 4, on the forward end 5 of the barrel 1.

The flash light per se forms no part of the present invention, but the arrangement of the cap or bellmouth, together with the unit that is to be installed, is the gist of the present invention.

Referring now for the moment to Fig. 4, there will be noticed a plate or disk 6, that has the central opening or window 7 therein directly in front of the lamp bulb 18, and eccentrically secured to the disk 6 is the slightly smaller disk 8, which is loosely riveted, as at 9, to the aforementioned disk 6. The disk 8 has the numerals 1, 2, 3, and 4 arranged around the disk, the numerals being stencil cut completely through the disk, so that light may pass therethrough, as will be shortly mentioned.

Also arranged in the same relationship from the center is the window or opening 10, so that numerals and this opening 10 will pass in front of the window 7 of the disk 6 when the disk 8 is revolved.

There will further be noticed a small detent 11 designed to be yieldingly mounted in a boss, which detent is soldered or otherwise affixed to the disk 6 and which is adapted to engage the notches 12 formed about the periphery of the disk 8.

It will be seen that the disk 8 is cut away or milled on its periphery, as at 13, so that the detent 11 may engage the notches 12 and at the same time permit the knurled periphery 14 to clear the detent. The five notches 12 are so arranged around the periphery of the disk 8 that when the detent 11 engages any one of them, a numeral will be centered with respect to the window 7.

Referring now for the moment to Fig. 7, there will be noticed the slot or kerf 15 arcuately arranged in the cap or bellmouth 3, and through this slot extends a portion of the periphery of the knurled disk 8, so that the operator may revolve this disk when he wants to change the image thrown on the translucent glass disk 16.

It will also be noticed that corresponding to each stencil on the disk 8 near the periphery thereof is a corresponding designating numeral, so that the operator may glance at the designating numeral on the disk 8 and ascertain what numeral is being flashed on the translucent glass of the flash light.

It will further be noticed in Figs. 1 and 2 that the kerf or slot 15 widens, as at 17, so that the light from the bulb 18 may be thrown directly on the designating numeral, which is, of course, indicative of the image being flashed on the translucent glass.

In Fig. 2, it will be seen that it is not necessary to have a reflector in the flash light, nor is it necessary to have a lens, a translucent piece of glass being substituted for the lens.

The lens of the conventional flash light is probably the most expensive element, so that by doing away with the lens and the reflector, the cost of the present device is little, if any, over the price of the conventional flash light.

It will be understood that the two disks of the unit may be readily stamped or molded and quickly assembled by riveting, as at 9, while a detent 11 may also be applied to the disk 6.

It is a simple matter to apply this unit, as after the kerf is once cut within the bellmouth, the disk 6 may be soldered in spots, as at 19, and after the translucent glass is placed in the cap, the device is ready for use.

As will be noticed, the disk 6 is set close to the bulb 18, as the closer it is to the lamp, the larger the image will be on the glass. However, by adjusting the cap with its unit relative to the bulb, the proper focus may be obtained.

The operation is so simple that it hardly needs description, it being understood that the operator will merely turn the knurled disk 8 to any one of the numerals desired, which can be observed by the designating numeral on the back of the disk. Again, if it is desired to use the signaling device as a lamp, the window 10 will be turned until it registers with the window 7.

From the foregoing, it will be seen that I have provided a signaling device which can be manufactured at a very low cost, while the assembling consists merely of soldering the disk 6 in position and permitting the attached disk to extend through a kerf for easy manipulation.

Having thus described my invention, what I claim as new and desire to secure by Letters Patent is:—

1. A flash light including a lamp, a disk fixedly arranged in front of the lamp and provided with a central window, a second disk with insignia therein to be brought in registry with the window, said second disk extending through the cap of the flash light for easy manipulation, corresponding designating insignia near the periphery of said second disk and illuminated when the light is flashed whereby the operator can determine what insignia is in registry with the opening, and a translucent glass forward of said disk on which a magnified image of the insignia will be flashed.

2. In a flash light having a bellmouth and a lamp bulb to the rear of the bellmouth, said bellmouth provided with a slot, a disk, provided with a window, permanently fixed in the bellmouth and the window directly in front of said bulb, a second disk eccentrically mounted on said first-mentioned disk, said second disk provided with insigna cut completely therethrough, said insignia adapted to be rotatively brought in front of said window, the said eccentric disk extending slightly through the slot in said bellmouth, and a translucent glass fitted in said bellmouth whereby the insignia may be flashed thereon when brought in registry with the window in the first-mentioned disk.

3. In a flash light having a lamp bulb and a cap extending beyond the lamp bulb, said cap provided with a slot, a disk provided with a window permanently fixed in the cap and the window being positioned directly in front of said bulb, a second disk rotatably and eccentrically mounted on said first-mentioned disk, said second disk provided with a window and insignia cut completely therethrough and arranged concentrically about its mounting, said insignia and last-mentioned window adapted to be rotatively brought in front of said first-mentioned window, the said eccentric disk extending slightly through the slot for manipulation by the operator, and a translucent glass fitted in said cap whereby the desired insignia may be flashed thereon when rotatively brought into registry with the window in the first-mentioned disk and whereby the two windows also may be brought into alignment to permit a maximum amount of light to pass through said translucent glass.

4. In a flash light having a slot extending through its cap and in a position slightly in advance of the lamp bulb of the flash light, a unit fixedly secured in the cap directly in front of said bulb, said unit comprising a disk with a central window, a second disk eccentrically mounted with relation to the first-mentioned disk, said second disk also provided with a window and stamped insignia all arranged concentrically, said second disk further provided with notches in its periphery, said first-mentioned disk provided with a detent to engage said notches to thereby lock the second disk in any one of a predetermined number of positions, further corresponding designating insignia on the rear of said second-mentioned disk, the slot in the cap permitting light to be thrown on this designating insignia whereby the operator may determine the insignia in registry with the opening in the first-mentioned disk, and a translucent glass in the forward portion of the cap on which the desired insignia will be flashed.

5. In a flash light having a slot cut in its cap and in a plane in advance of the lamp bulb, a disk permanently fixed over the lamp bulb and having a central window in registry with the lamp bulb, a second disk eccentrically mounted on said first-mentioned disk and provided with a window and cut insignia therein, the said second-mentioned disk extending through the slot in said cap, corresponding designating insignia to the rear of the disk and near its periphery and the slot arranged to illuminate said designating insignia, means for holding the rotatable disk in predetermined positions, and a translucent glass in the forward end of the cap on which the insignia in registry with the opening in the first-mentioned disk will be flashed and in a magnified condition.

6. A flash light including a lamp, a translucent glass in front of said lamp, disk means provided with a central opening for blocking out all of the light from the lamp except through said opening, rotative means eccentrically positioned on said disk means having insignia cut therein, said rotative means adapted to bring the insignia in front of said opening in said disk means and be flashed in a magnified condition on said translucent glass, means for temporarily locking the rotative means with its insignia in a desired position, and further corresponding designating insignia on the rotative means whereby the image flashed on the translucent glass may be ascertained without looking at the said translucent glass.

7. A unit for a flash light comprising two disks one of which has a central opening and the other of which is eccentrically mounted with relation to the first-mentioned disk, said second disk having a window and insignia cut therethrough, said window and said insignia being arranged concentrically of the second disk whereby they may be brought into registry with the opening in the first-mentioned disk, the said second-mentioned disk being knurled about its outer edge, said disk also provided with notches arranged inwardly from the knurled portion, and a detent for engaging said notches.

JOHN H. WEINER.